United States Patent
Aoyama (10) Patent No.: US 7,111,015 B2
(45) Date of Patent: Sep. 19, 2006

(54) APPARATUS AND METHOD FOR SEARCHING FILES

(75) Inventor: Yoshiaki Aoyama, Tokyo (JP)

(73) Assignee: TEAC Corporation, Tokyo (JP)

( * ) Notice: Subject to any disclaimer, the term of this patent is extended or adjusted under 35 U.S.C. 154(b) by 445 days.

(21) Appl. No.: 10/136,285

(22) Filed: May 2, 2002

(65) Prior Publication Data

US 2002/0169766 A1    Nov. 14, 2002

(30) Foreign Application Priority Data

May 11, 2001    (JP)    ............... 2001-142464

(51) Int. Cl.
 *G06F 17/30*    (2006.01)
(52) U.S. Cl. ............... 707/103 Y; 707/3; 707/6; 707/8; 707/101; 707/102; 707/104.1; 707/205
(58) Field of Classification Search ............ 707/1, 707/2, 3, 6, 8, 101, 102, 103 Y, 104.1, 205; 706/47
See application file for complete search history.

(56) References Cited

U.S. PATENT DOCUMENTS

| | | | | |
|---|---|---|---|---|
| 5,093,779 A | * | 3/1992 | Sakurai | 707/1 |
| 5,239,647 A | * | 8/1993 | Anglin et al. | 707/205 |
| 5,272,625 A | * | 12/1993 | Nishihara et al. | 707/1 |
| 5,295,261 A | * | 3/1994 | Simonetti | 707/2 |
| 5,361,349 A | * | 11/1994 | Sugita et al. | 707/8 |
| 5,379,262 A | * | 1/1995 | Okamoto et al. | 365/230.01 |
| 5,806,072 A | * | 9/1998 | Kuba et al. | 707/200 |
| 6,192,373 B1 | * | 2/2001 | Haegele | 707/104.1 |
| 6,292,797 B1 | * | 9/2001 | Tuzhilin et al. | 707/6 |
| 6,415,359 B1 | * | 7/2002 | Kimura et al. | 711/137 |
| 6,684,219 B1 | * | 1/2004 | Shaw et al. | 707/103 R |
| 6,907,414 B1 | * | 6/2005 | Parnell | 706/47 |
| 2002/0169928 A1 | * | 11/2002 | Kimura et al. | 711/137 |
| 2005/0091223 A1 | * | 4/2005 | Shaw et al. | 707/100 |

OTHER PUBLICATIONS

Thompson, K., "Unix (TM) Implementation," 1978, Bell System Technical Journal, vol. 56, No. 6, 9 pages.*

* cited by examiner

*Primary Examiner*—Thuy N. Pardo
(74) *Attorney, Agent, or Firm*—Oliff & Berridge, PLC (57) ABSTRACT

A searching apparatus and a method thereof using a management table. A hierarchical structure of directories is created in a recording medium. With respect to at least one directory to be considered, the management table is associated with a list of contents of another directory other than the directory to be considered. In searching for a file, it is not necessary to move from the directory to be considered, and any directories or files which satisfy a specified searching condition are retrieved by looking up the management table of the directory to be considered.

17 Claims, 7 Drawing Sheets

| NAME OF IMAGE DATA FILE | CLUSTER ID | PATIENT IDENTIFIER | IMAGING DATE | TEST IDENTIFIER |
|---|---|---|---|---|
| pppp | nnn | a | x | mmm |
| qqqq | lll | a | y | ccc |

Fig. 7

|  | PATIENT<br>IDENTIFIER | SHOOTING<br>DATE | TEST<br>IDENTIFIER | NAME OF<br>IMAGE DATA FILE |
|---|---|---|---|---|
| ¥ | a<br>(¥a) | x<br>(¥a¥x) | p<br>(¥a¥x¥p)<br>q<br>(¥a¥x¥q)<br>⋮ | ℓ<br>m<br>n |
|  |  | y<br>(¥a¥y)<br>⋮ |  |  |
|  | b<br>(¥b) | y<br>(¥b¥y) |  |  |
|  |  | z<br>(¥b¥z)<br>⋮ |  |  |

Fig. 8

APPARATUS AND METHOD FOR SEARCHING FILES

BACKGROUND OF THE INVENTION

1. Field of the Invention

The present invention relates to a file management technique using a hierarchical structure of directories.

2. Description of the Related Art

Figure 6:
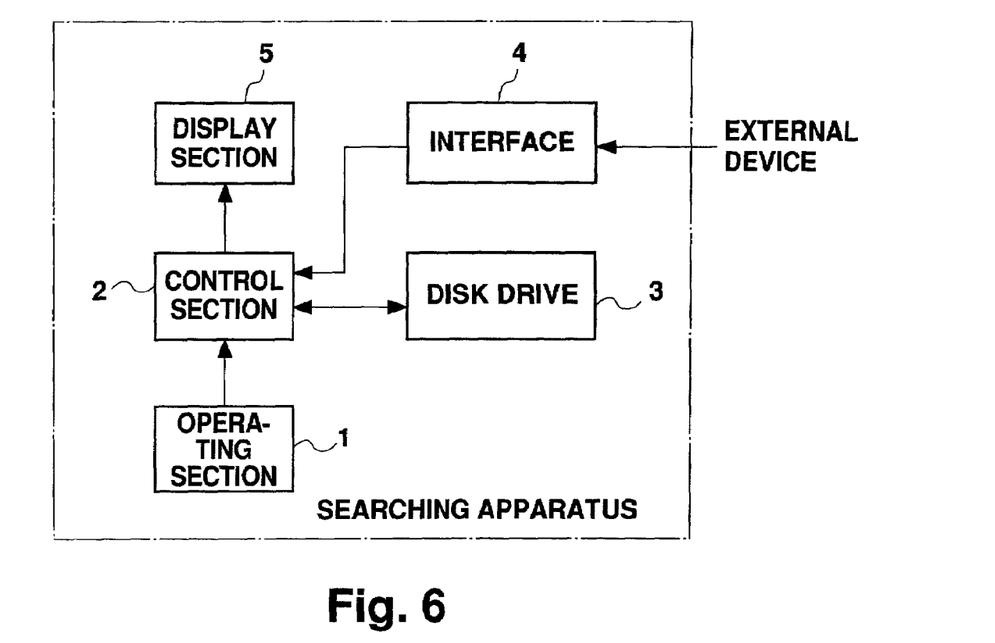
FIG. 6 is a block diagram illustrating the structure of a file searching apparatus of the related art.

Today's advanced computer technology has led to development of apparatuses for managing and searching files. Such apparatuses record various types of data files on a certain recording media, such as a magneto-optical disk (MO). One example of such an apparatus for searching image data files is an apparatus for searching medical image data files. As shown in FIG. 6, a typical medical image data file searching apparatus includes an operating section 1, a control section 2, a disk drive 3, an interface 4, and a display section 5. The operating section 1 is a keyboard or the like, from which a user enters information to the control section 2. In response to the instruction entered from the operating section 1, the control section 2 records a data file on a recording medium held in the disk drive 3.

The disk drive 3 writes and reads data to and from the recording medium, such as an MO, in response to instructions from the control section 2. The interface 4 may be, for example, one confirming to the RS-232 standard, and is connected to an external device, such as a CT (Computerized Tomography) apparatus. The display section 5 is a display apparatus or the like.

Figure 7:
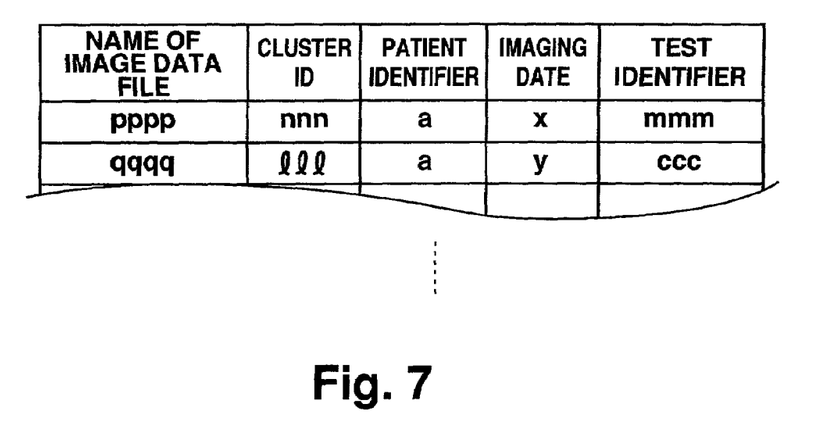
FIG. 7 is a descriptive view illustrating the contents of a management table of the related art.

The control section 2 stores image data supplied from the external device via the interface 4 in the recording medium as an image data file in a predetermined format, and updates a management data file which describes the contents of each image data file. As shown in FIG. 7, the management data file consists of pieces of information identifying a particular image data file, such as a starting position of a record (e.g., a cluster ID) on the recording medium and a file name, together with associated information (management information) data including a patient identifier, an imaging date, and a test identifier.

During data recording, a user operates the operating section 1 to enter a patient identifier. In response, the control section 2 is placed in a recording standby state. When the recording button on the operating section 1 is depressed, the control section 2 allocates a test identifier to image data supplied via the interface 4, and outputs an instruction to the disk drive 3 to record the image data as an image data file. At the same time, the control section 2 associates the information identifying the image data file with the patient identifier entered by a user, current date (available from a clocking section which is not shown in the figure), and the allocated test identifier, and records this data in the management data file.

To view image data files, a user enters a particular patient identifier from the operating section 1. In response, the control section 2 looks up the management data file to search for the entered patient identifier, and creates a list of imaging dates associated with the patient identifier. The list is displayed on the display section 5 and, when the user specifies a particular imaging date, the control section 2 selects a matching imaging date from the retrieved list, and displays the image data files associated with the particular imaging date on the display section 5 in seriatim.

Alternatively, a user may select a desired data file according to the imaging date, rather than a patient identifier. In such a case, the user uses the operating section 1 to enter a particular imaging date. In response to this input, the control section 2 looks up the management data file, creates a list of image data files associated with the entered imaging date, and displays the list on the display section 5. When so instructed by the user, the image data files of the list may be displayed succeedingly.

In this type of searching apparatus, dedicated software is required because the apparatus uses the management data file. To facilitate viewing the image data on a personal computer, there has been developed an apparatus which creates a hierarchical structure of directories using a widely known file system used in personal computers to classify and manage the image data files.

Figure 8:
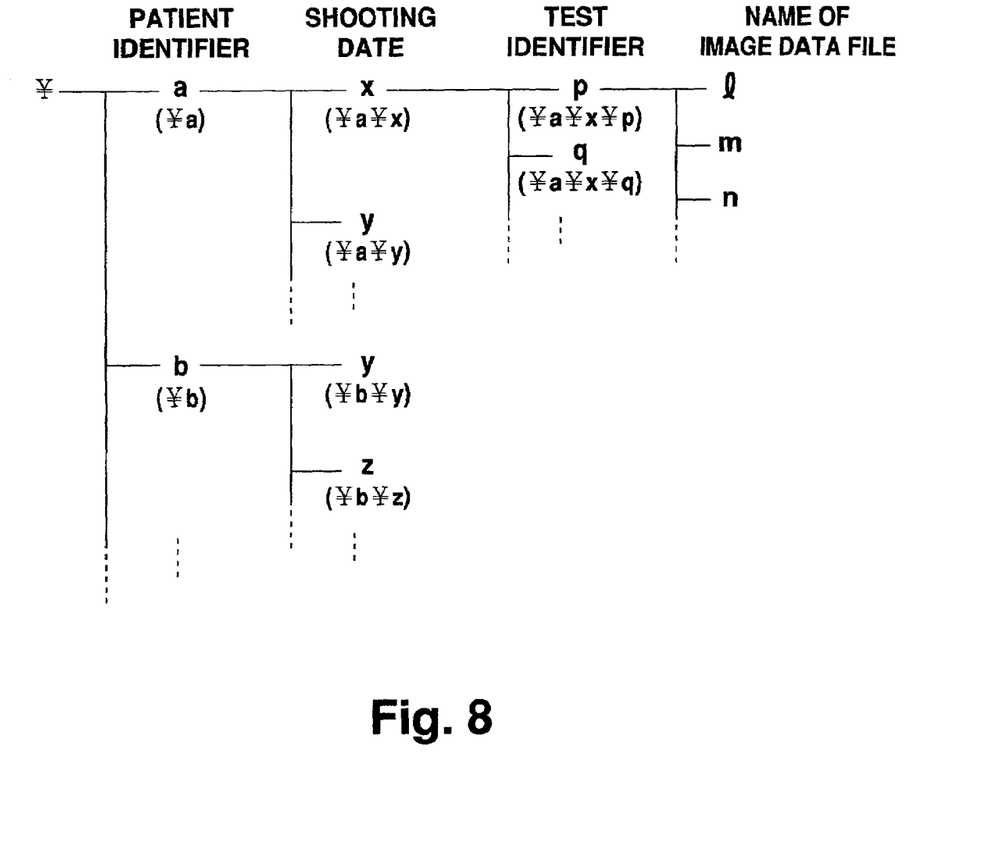
FIG. 8 is a descriptive view illustrating the hierarchical structure of directories of the related art.

FIG. 8 shows an example of such a hierarchy of directories used for classification and management of image data files. Herein, a root directory (¥) is created for accumulating image data files. Under the root directory, subdirectories are created for each patient identifier, under which subdirectories are created for each imaging date. Under the subdirectories of imaging date, other subdirectories are created for each test identifier, in each of which at least one image data file being stored.

To implement a searching method utilizing the hierarchical structure of directories, the control section 2 operates as follows during imaging. Specifically, when a particular patient identifier is entered from the operating section 1, the control section 2 checks if a directory corresponding to the entered patient identifier already exists. If such a directory is found, that directory is then searched for a directory corresponding to the current date (imaging date). If found, it is further checked in the current date directory for a directory corresponding to a test identifier allocated at the time of imaging. If found, then an image data file is stored in the test identifier directory. However, if no directory has been created for the patient identifier, the imaging date, or the test identifier, a corresponding directory is created and the image data files are stored therein.

In this method, if image data files are in a standard format, such as the JPEG (Joint Picture Expert Group) format, a desired image data file is retrieved on a personal computer by following the hierarchy of directories, that is, opening a directory of patient identifier corresponding to a desired image data file, a directory of a desired imaging date, and a directory of a desired test identifier.

In the searching method using the management data file, overall processing load may increase, because the size of the management data file becomes bigger as the recording medium has larger capacity. As a consequence, searching while viewing files requires a greater amount of time, or more space in a working memory is used while the control section 2 reads the management data file.

When managing and searching files in the hierarchical structure of directories, if it is desired to view a list of test identifiers, for example, those associated with a particular imaging date when searching directories corresponding to a desired patient identifier or imaging date, a recursive search is required. Specifically, a user must move a current working directory from the root directory to a patient identifier directory, and must then return to the root directory to restart the search for another patient identifier directory. As a result, when the recording medium has a large capacity, a substantial amount of time is required for searching and reading.

SUMMARY OF THE INVENTION

It is an objective of the present invention to provide an apparatus and a method for searching files, which enables a quick search of a desired file with an improved searching efficiency.

A file searching apparatus according to the present invention comprises a storage means for storing files, a hierarchical structure of directories of the files, and a management table; an input means for entering a searching condition; and a searching means for searching the storage means to retrieve a matching file corresponding to the searching condition by using the hierarchical structure of directories and the management table. The management table is associated with a particular directory within the hierarchical structure of directories and includes a list of contents of another directory located in a class different from the class of the above-mentioned particular directory. By using the hierarchical structure of directories in combination with the management table, an improved searching efficiency can be achieved.

In one aspect of the present invention, the above-mentioned directory located in a class different from the class of the particular directory is a directory located at least two classes apart from the particular directory, and the management table includes a list of contents of said directory.

According to this aspect of the present invention, the management table may include a first management table which is associated with the particular directory and has a list of contents of a first directory located in a class different from the class of the particular directory, and a second management table which is associated with the first directory and has a list of contents of a second directory located in a class different from the class of the first directory. Both the first and second management tables can be located in a certain directory, e.g., a root directory, of the hierarchical structure of directories. Alternatively, it is also possible to arrange the first management table in the particular directory of the hierarchical structure of directories, and arrange the second management table in the first directory of the hierarchical structure of directories. The searching means searches the list of contents of the first management table to select a matching directory corresponding to a searching condition, and further searches the list of contents of the second management table corresponding to the selected directory to acquire the list of contents of the second directory, thereby retrieving a matching file corresponding to the searching condition.

The present invention also provides a method for searching files stored in a storage medium. The method includes the steps of (a) entering a searching condition, and (b) searching and retrieving a matching file corresponding to the searching condition using a hierarchical structure of directories and a management table which are stored in the storage medium. The management table is associated with a particular directory within the hierarchical structure of directories and has a list of contents of another directory located in a class different from the class of the particular directory.

The present invention also provides a storage medium for storing files. The storage medium is computer-accessible, and includes file data, data of a hierarchy of directories describing a hierarchical structure of directories of the file data, and management table data associated with a particular directory within the hierarchical structure of directories and describes the contents of another directory located in a class different from the class of the particular directory.

The present invention will be more readily understood from the following description.

DESCRIPTION OF THE PREFERRED EMBODIMENT

Figure 1:
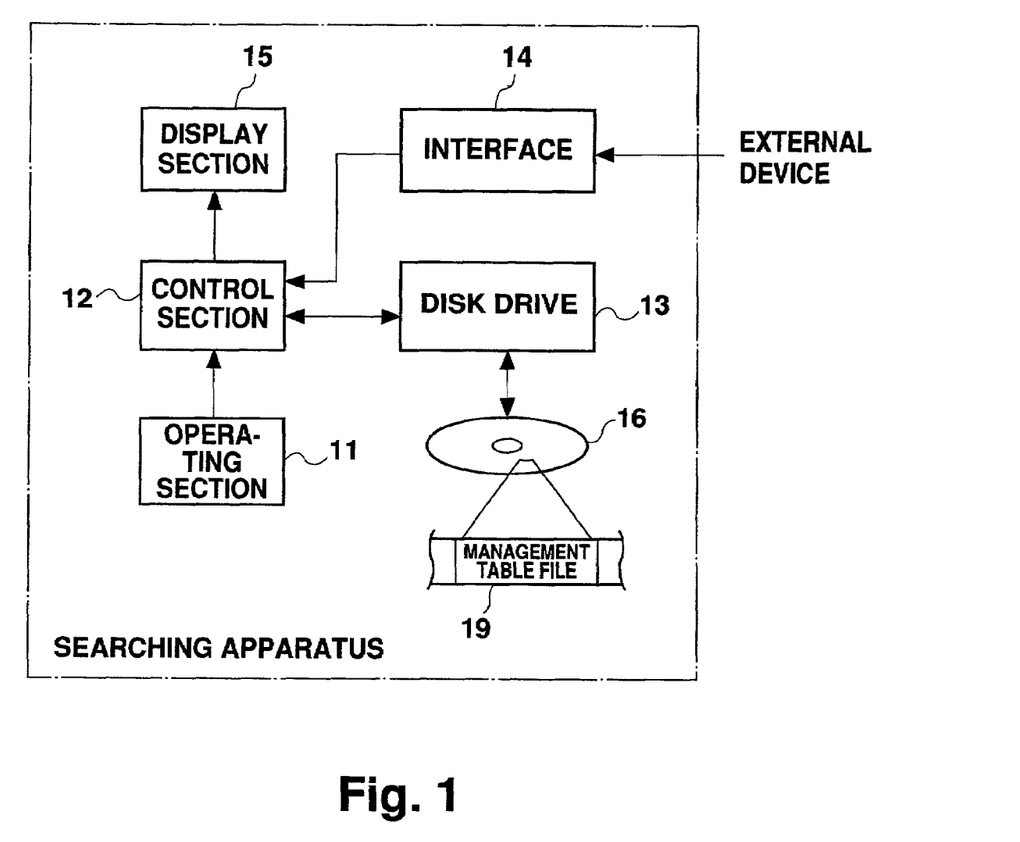
FIG. 1 is a block diagram illustrating the structure of a file searching apparatus.

A preferred embodiment of the present invention will be described below with reference to the attached drawings. FIG. 1 shows a block diagram of the structure of a searching apparatus according to the present invention. The searching apparatus consists of functional blocks similar to those of the searching apparatus shown in FIG. 6. Specifically, the searching apparatus of FIG. 1 includes an operating section 11, a control section 12, a disk drive 13, an interface 14, a display section 15 and a storage medium 16, such as an MO. However, the operation of the control section 12 and the data recording structure of the recording medium 16 are different from the searching apparatus of FIG. 6.

The control section 12 stores image data files in the recording medium 16. The image data files are structured in a hierarchy of directories as shown in FIG. 8. In the root directory of the hierarchy, the control section 12 also stores a management table file 19 describing a list of contents stored in a certain directory (e.g., an imaging date directory of FIG. 8) located in a class lower than a predetermined class. As such, the recording medium 16 stores both the hierarchy of directories and the management table file. A description of each list (referred to as a management table hereinafter) is related to a particular directory to be considered and includes a list of contents (directories or files) of another directory, one other than the directory to be considered.

Figure 2A:
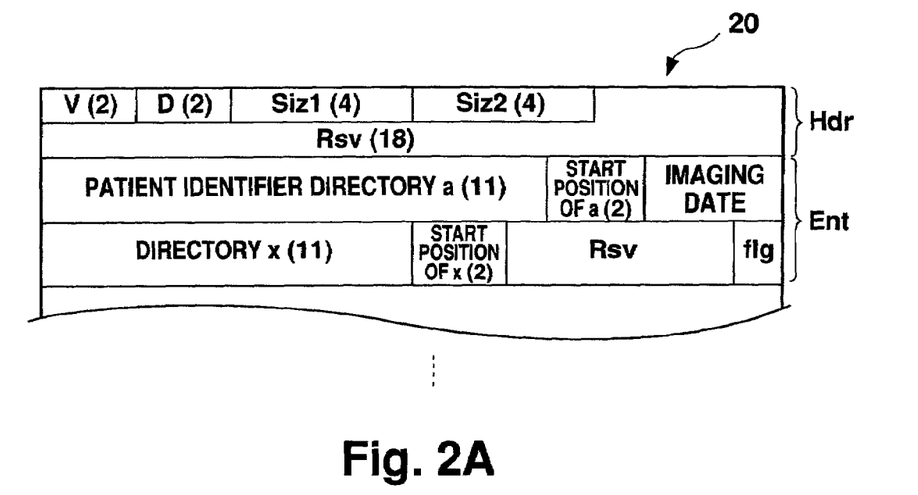
FIG. 2A is a descriptive view illustrating the contents of a first management table.
Figure 2B:
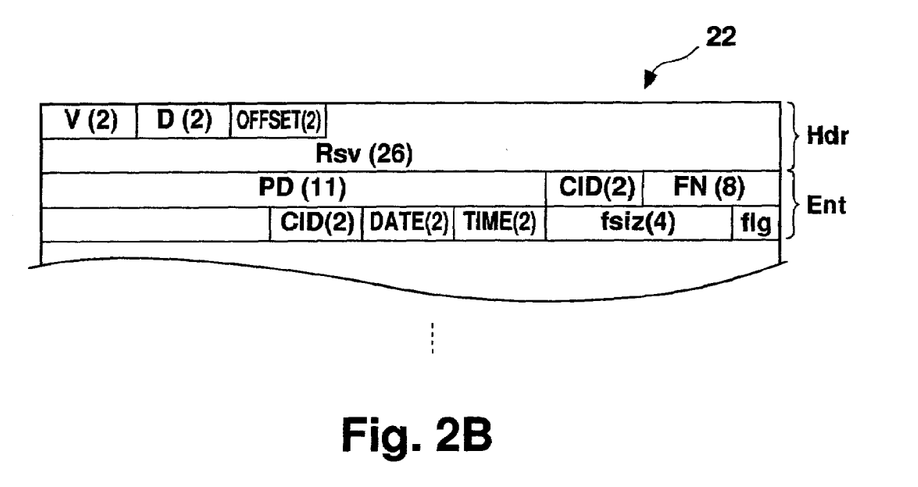
FIG. 2B is a descriptive view illustrating the contents of a second management table.

Specifically, in addition to the hierarchical structure of directories as shown in FIG. 8, the management table file 19 stored in the recording medium 16 of this embodiment includes a first management table 20 consisting of a list of imaging date directories as shown in FIG. 2A, and a second management table 22 consisting of a list of image data files as shown in FIG. 2B. The first management table 20 regards the root directory as a directory to be considered and includes a subdirectory (i.e., a patient identifier directory) of the root directory. Basically, the first management table 20 has a header (Hdr) consisting of version information of the file structure (V) and the directory to be considered associated with the table (D), and multiple entries (Ent) corresponding to each imaging date directory. In the figure, it should be noted that numbers in brackets indicate a bit number, and that the directory to be considered is recorded as a starting position (e.g., a cluster ID) on the recording medium. The header also includes the size (siz1) of the first management table 20 and the size (siz2) of the second management table 22. Rsv represents a reserved area which is to be padded with a random number (e.g., "0").

Each entry includes the name of a patient identifier directory which is the parent directory of a particular imaging date directory, a starting position (e.g., a cluster ID) of the patient identifier directory, and the name and the starting position of the imaging date directory. For example, FIG. 2A illustrates a case of imaging a patient having a patient identifier "a" on an imaging date "x", and includes the entry corresponding to the patient identifier "a" and the imaging date "x". Here, it should be noted that the first management table 20 holds a list of contents of the imaging date directory which is located two classes lower than the root directory.

The second management table 22 regards the imaging date directory as a directory to be considered, and includes multiple subdirectories (test identifier directories) which belong to the directory to be considered. As shown in FIG. 2B, the second management table 22 includes a header (Hdr) containing version information (V) of the file structure and a starting position (D) of the directory to be considered associated with the table, and multiple entries (Ent) corresponding to each image data file. Because the entries of the second management table 22 correspond to files, such as image data files, each entry includes the name of a parent directory (PD) which includes the particular file, a starting position (CID) thereof, the name of the particular file (FN), a starting position (CID) thereof, the latest date and time of modification (Date, Time), and the file size (fsiz). The parent directory of image files is the test identifier directory, and the name of each test identifier is stored in PD. It should be noted that the image data files are in this embodiment limited to particular types, such as JPEG-based files, so that the file name can be described on the table without identification information, such as an extension, which specifies the file type, and FN consists of 8 bytes. It should also be noted that CID stores the head indicating a corresponding file or directory on the FAT (File Allocation Table). This is provided to read files faster, as an MO disk is formatted by "VFAT" used in the Windows® OS produced by Microsoft Corporation. Thus, the second management table holds a list of contents of the image file directory located two classes lower than the imaging date directory.

Next, the operation of the control section 12 will be described with respect to the start-up operation and the searching operation.

Upon start-up, the control section 12 searches for the management table file 19 within the root directory of the storage medium 16 and verifies the presence of the management table file 19. If the management table file 19 is found, the control section 12 reads from the management table 19 the first management table 20 associated with the root directory. If the management table file 19 is not found, the control section 12 analyzes the hierarchical structure of directories to create the management tables 20, 22 as shown in FIGS. 2A and 2B, and stores them as the management table file 19 in the root directory. It should be noted that, upon receiving image data from the external device, the control section 12 stores the image data in the recording medium 16 and updates the corresponding management tables 20, 22.

Figure 3:
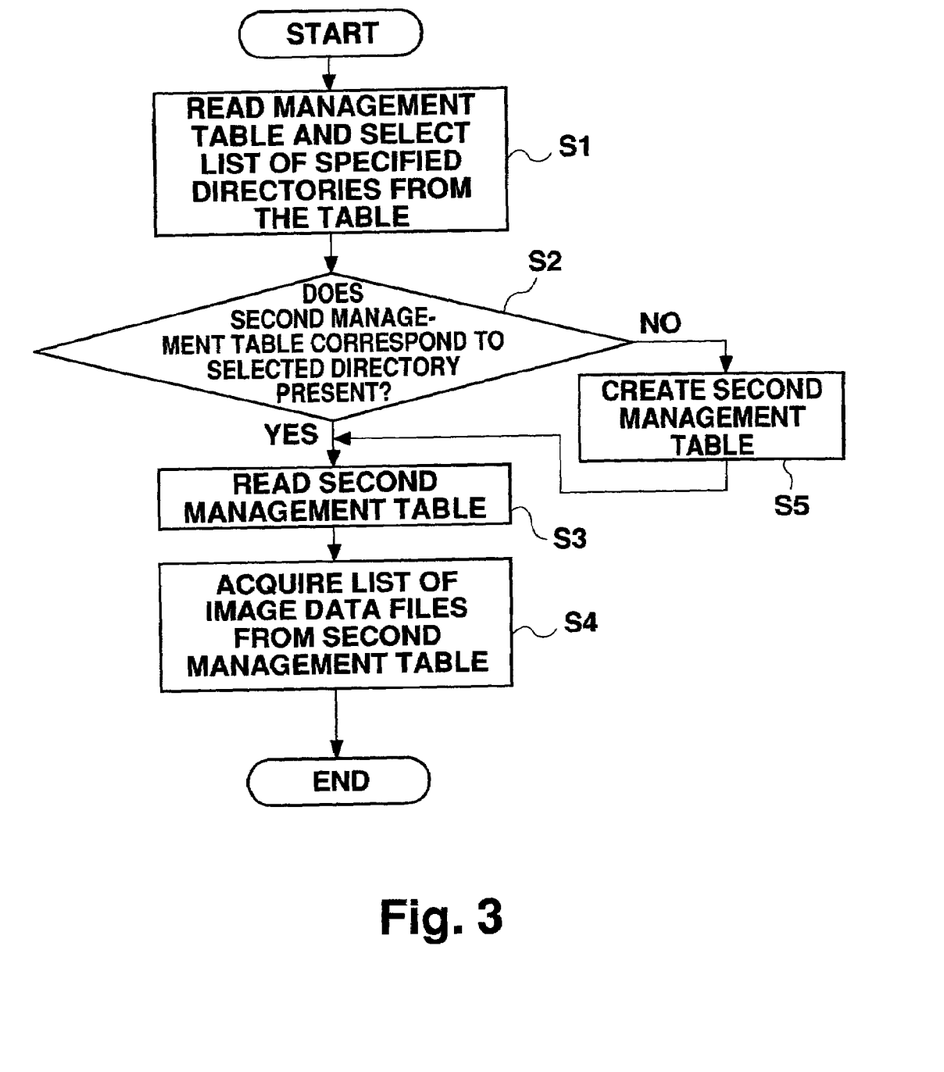
FIG. 3 is a flowchart illustrating the search process of the control section of FIG. 1.

As to the search operation of the control section 12, FIG. 3 shows a flowchart of the search process in a case wherein the control section 12 specifies a particular imaging date from the root directory "¥". The control section 12 looks up the entries of the management table (i.e., the first management table 20 associated with the root directory) and selects a list of directories corresponding to the specified imaging date (S1). For example, if multiple directories exist for a specified imaging date "x" under both the directory "¥a" of a patient identifier "a" and the directory "¥b" of a patient identifier "b", the directories "¥a¥x" and "¥b¥x" are selected. Then, the control section 12 searches the management table file 19 to check for the presence of another management table (the second management table 22) which regards the selected directories as the directories to be considered (S2). If a matching second management table 22 is found, the control section 12 reads the second management table 22 (S3), acquires a list of image data files contained in the second management table 22 (S4) to finish the process, and displays the search results in seriatim. When in the process S2 no matching second management table 22 is found, the control section 12 reports the absence of the second management table 22 to the user, analyzes the hierarchical structure of directories to create the second management table 22 (S5), and proceeds to the process S3. It should be noted that if the second management table 22 is absent, it is also possible to follow the hierarchical structure of directories as in the conventional art and display the results succeedingly.

In the process shown in FIG. 3, after the imaging date has been specified, the image data files shot on the specified date are immediately displayed in seriatim. Alternatively, it is also preferable to receive other searching conditions, such as the name of a test identifier or an image data file, from a user before proceeding to the process S4, and search for matching image data files in the second management table 22 read in the process S3 to show the retrieved image data files succeedingly.

When creating a file, a corresponding management table 20 or 22 is searched, according to the location where a file is to be stored, and information, such as the name, date of creation, size, etc. of a file, are added to the management table 20, 22. Similarly, when a directory is newly created, information is added to the corresponding management table 20, 22. When a corresponding management table 20, 22 is not found when newly creating a file or a directory, the management table 20, 22 itself is created simultaneously. In this way, the management tables 20, 22 are maintained. In the present embodiment, when searching image data files, the management table file 19 consisting of the first and second management tables 20, 22 is consulted. Because the management table file 19 is divided into the first and second management tables 20, 22 corresponding to individual directories, it is sufficient to read a matching management table 20 or 22 to view a list of contents of another directory different from the current directory. In this way, the efficiency of search is improved.

Figure 4:
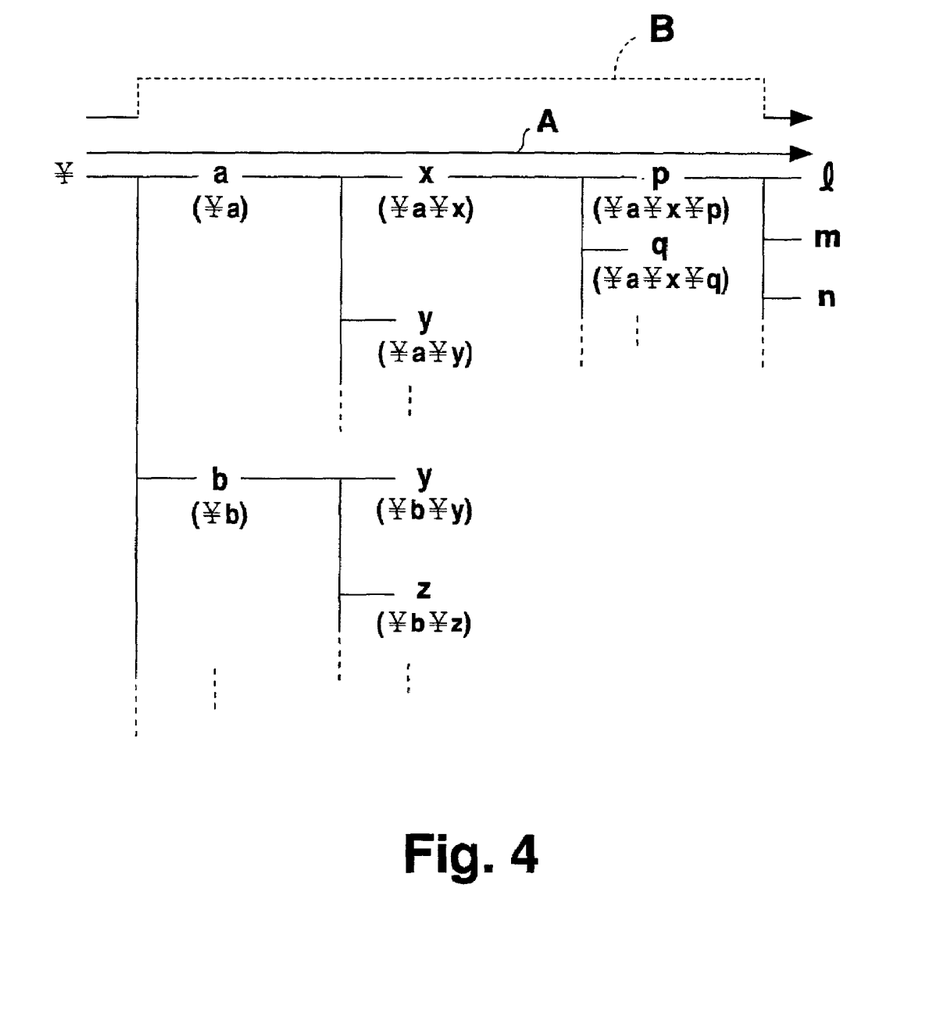
FIG. 4 is a descriptive view illustrating a search process using only a modified directory structure and a search process using the management table.

FIG. 4 shows the search models of image files in a case wherein only the hierarchical structure of directories is used and in a case wherein the management table file 19 is used in addition to the hierarchy of directories in accordance with the present embodiment. When searching a desired image file m using only the hierarchy of directories, the search starts from the root directory ¥ and proceeds through each subdirectory, as indicated by a line A in the figure. That is, Line A: ¥→¥a→¥a¥x→¥a¥x¥p→image file m In contrast, when searching the image m using the management table file 19 as well as the hierarchy of directories, the image m can be located immediately by looking up the first and second management tables 20, 22 of the management table file 19 located in the root directory, as indicated by a line B in the figure. That is, Line B: ¥→(Look up the management table 19)→image file m As such, it is apparent that a desired file can be searched for and retrieved quickly in accordance with the present embodiment.

Figure 5A:
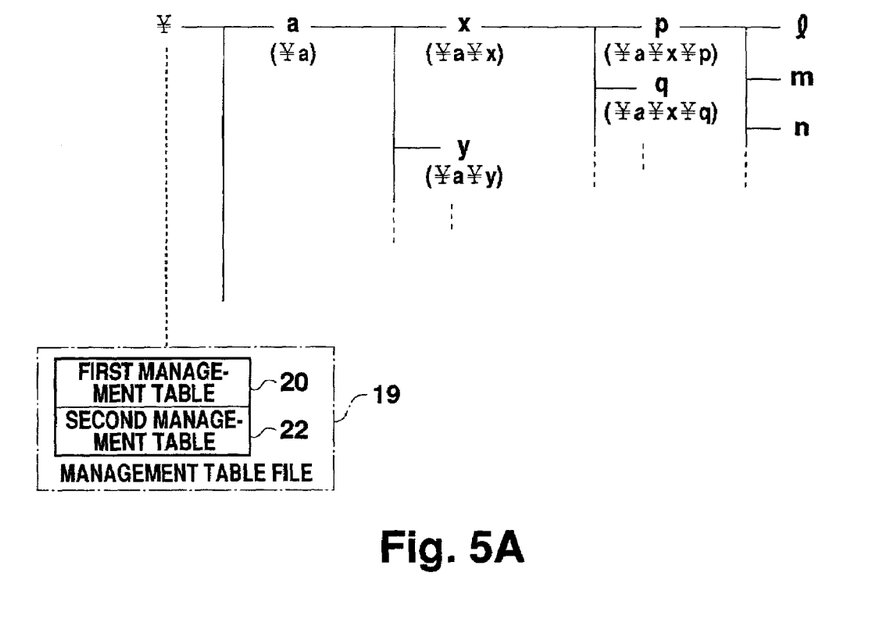
FIG. 5A is a descriptive view illustrating the first and second management tables located in a root directory.

In the above example, both management tables 20, 22 are contained in the management table file 19 and located in the root directory. It is, however, also possible to arrange the management tables 20, 22 separately in different directories to be considered. For example, the management table 20 associated with the root directory "¥" may be arranged in the root directory, while the management table 22 associated with the directory "¥a¥x" of the imaging date directory "x" under the directory of the patient identifier "a" may be arranged in the directory "¥a¥x". FIG. 5A shows a case wherein both management tables 20, 22 are arranged in the root directory, and FIG. 5B shows the management tables 20, 22 arranged separately in different directories.

Figure 5B:
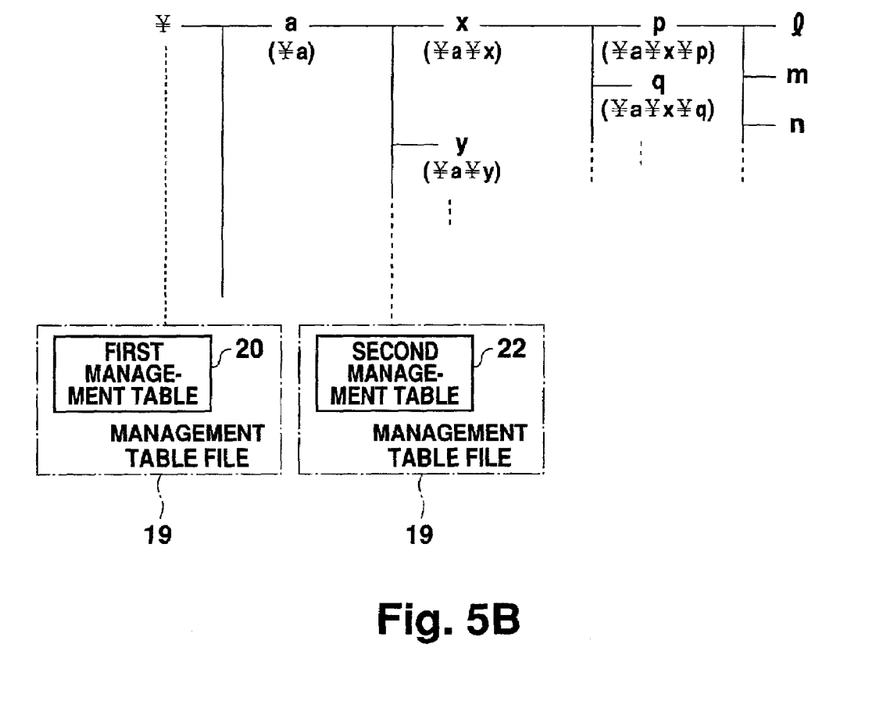
FIG. 5B is a descriptive view illustrating the first and second management tables located separately in different classes.

In the case shown in FIG. 5B, when an imaging date is specified, the control section 12 reads the management table file 19 (including the first management table 20) located in the root directory, and selects a particular directory corresponding to the specified imaging date. Then, the process proceeds to the selected directory where the management table file 19 (including the second management table 22) located in the selected directory is consulted. Using a list of image data files described in the second management table 22, the search process continues, or the search results are displayed succeedingly.

In a case wherein the management table files are arranged separately, the management table file 19 located in the imaging date directory "¥a¥x", for example, may include multiple management tables associated with other directories, such as "¥a¥y" or "¥", in addition to the management table 22 associated with the directory "¥a¥x". In other words, the contents of each management table file 19 may overlap.

Although the management table file 19 has been used for the search process in the above description, the management table file 19 may also be used for confirming file transfer when image data files are transferred to other computer systems, as will be described below.

Assuming that the control section 12 is connected to an external computer via a network, the control section 12 selects image data files to be transferred and transfers them to the external computer via the network. To indicate completion or incompletion of file transfer, the control section 12 writes a flag indicating the completion of file transfer in a corresponding entry of the management tables 20, 22 when storing image files and updating the management tables 20, 22. Because the management tables are updated before a file is transferred, a flag indicating this state is initially set in the entry. The flag may be assigned, for example, the last byte of the entry (see "flg" of FIGS. 2A and 2B).

During the transfer process, the control section 12 looks up the management data file 19 to detect the presence of an image data file having a flag indicating that the file has not yet been transferred, and, if a matching image data file is found, transfers it to the external computer via the network. After that, the control section 12 replaces the flag corresponding to the transferred image data file in the entry of the management data file 19 with a flag indicating the completion of file transfer.

In the embodiment set forth above, a hierarchical tree structure of directories is created, and a list of directories or files (contents) of individual directories is accumulated. A particular directory is regarded as a directory to be considered, with which a list of contents of another directory (a target directory) other than the directory to be considered is associated as a management table. The target directory may be, for example, any subdirectory included in the directory to be considered. Each directory to be considered has a separate management table, which alleviates a load of reading individual management tables. Each management table includes the list of contents of individual subdirectories, which improves the efficiency of search. It should be noted that although the example management tables 20, 22 include data of the directory located two classes lower than the directory to be considered in the above embodiment, the management tables 20, 22 may include data of a directory located more than two classes lower than the directory to be considered, or data of a directory located higher than the directory to be considered.

Although the embodiment of the present invention have been described above, it should be understood that the present invention is not limited thereto. Instead, it is intended to cover many variations and modifications, as will be apparent to those skilled in the art.

What is claimed is:

1. A file searching apparatus which forms a hierarchical structure of directories and manages files, wherein:

a management table which is associated with a particular directory within said hierarchical structure of directories and which records at least one of a name of a subdirectory located in a class at least two classes deeper than said particular directory is stored, and a name of a file located in a class at least two classes deeper than said particular directory is stored, and said management table is supplied for accessing, from said particular directory, a directory or a file in a directory different from said particular directory, and comprises at least one of imaging date directories and image data files of a file structure.

2. A file searching apparatus according to claim 1, wherein said management table includes a first management table associated with said particular directory and having a list of contents of a first directory located in a class different from the class of said particular directory, and a second management table associated with said first directory and having a list of contents of a second directory located in a class different from the class of said first directory.

3. A file searching apparatus according to claim 2, wherein both said first and second management tables are located in one directory within said hierarchical structure of directories.

4. A file searching apparatus according to claim 2, wherein said first management table is located in said particular directory of said hierarchical structure of directories, and said second management table is located in said first directory of said hierarchical structure of directories.

5. A file searching apparatus according to claim 3, wherein said one directory is a root directory.

6. A file searching apparatus according to claim 4, wherein said particular directory is a root directory, and said first directory is a subdirectory of said root directory.

7. A file searching apparatus according to claim 1, wherein said list of contents includes an identifier and an address of a file which belongs to a directory located in a class different from the class of said particular directory.

8. A file searching apparatus according to claim 2, wherein said list of contents of said first directory includes an identifier and an address of a file which belongs to said first directory, and said list of contents of said second directory includes an identifier and an address of a file which belongs to said second directory.

9. A file searching apparatus according to claim 2, wherein said searching means selects a matching directory corresponding to said searching condition from the list of contents of said first management table, and acquires the list of contents of said second directory from said second management table corresponding to the selected directory, to thereby retrieve a matching file corresponding to said searching condition.

10. A file searching apparatus according to claim 9, wherein said file is a medical image file;
said hierarchical structure of directories includes a root directory, a patient identifier directory, an imaging date directory, a test identifier directory, and image data files;
said first management table is associated with said root directory and includes a list of contents of said imaging date directory located two classes lower than said root directory;
for each directory of said imaging date directory, said second management table includes a list of contents of the image data files located two classes lower than said imaging date directory; and
when a particular imaging date is entered as the searching condition, said searching means looks up said first management table to select a matching imaging date directory, and further looks up said second management table corresponding to said selected imaging date directory to retrieve a matching image data file.

11. A method for searching files stored in a storage medium, comprising the steps of:
(a) entering a searching condition; and
(b) searching and retrieving a matching file corresponding to said searching condition by using a hierarchical structure of directories and a management table stored in said storage medium,
wherein said management table records, in association with at least one of a particular directory in said hierarchical structure of directories, a name of a subdirectory located in a class at least two classes deeper than said particular directory, and a name of a file located in a class at least two classes deeper than said particular directory, and the management table comprises at least one of imaging date directories and image data files of a file structure.

12. A method for searching files stored in a storage medium according to claim 11, further comprising the steps of:
when a new file is to be stored in said storage medium, updating said management table based on a position where said new file is stored.

13. A method for searching files stored in a storage medium according to claim 11,
wherein said management table includes a first management table associated with said particular directory and having a list of contents of a first directory located in a class different from the class of said particular directory, and a second management table associated with said first directory and having a list of contents of a second directory located in a class different from the class of said first directory.

14. A storage medium for storing files, said storage medium being accessible by a computer, comprising:
file data;
data of a hierarchy of directories describing a hierarchical structure of directories of said file data;
management table data associated with a particular directory within said hierarchical structure of directories, and which records at least one of a name of a subdirectory located in a class at least two classes deeper than said particular directory and a name of a file located in a class at least two classes deeper than said particular directory, and comprises at least one of imaging date directories and image data files of a file structure.

15. A storage medium for storing files according to claim 14,
wherein said management table includes a first management table associated with said particular directory and having a list of contents of a first directory located in a class different from the class of said particular directory, and a second management table associated with said first directory and having a list of contents of a second directory located in a class different from the class of said first directory.

16. A storage medium for storing files according to claim 15,
wherein said list of contents of said first directory includes an identifier and an address of a file which belongs to said first directory, and said list of contents of said second directory includes an identifier and an address of a file which belongs to said second directory.

17. A storage medium for storing files according to claim 15,
wherein said files are medical image files,
wherein said hierarchical structure of directories includes a root directory, a patient identifier directory, an imaging date directory, a test identifier directory, and image data files,
wherein said first management table is associated with said root directory and includes a list of contents of said imaging date directory located two classes lower than said root directory, and
wherein said second management table includes a list of contents of an image data file located two classes lower than said imaging date directory for each directory of said imaging date directory.

* * * * *